Figure 1:
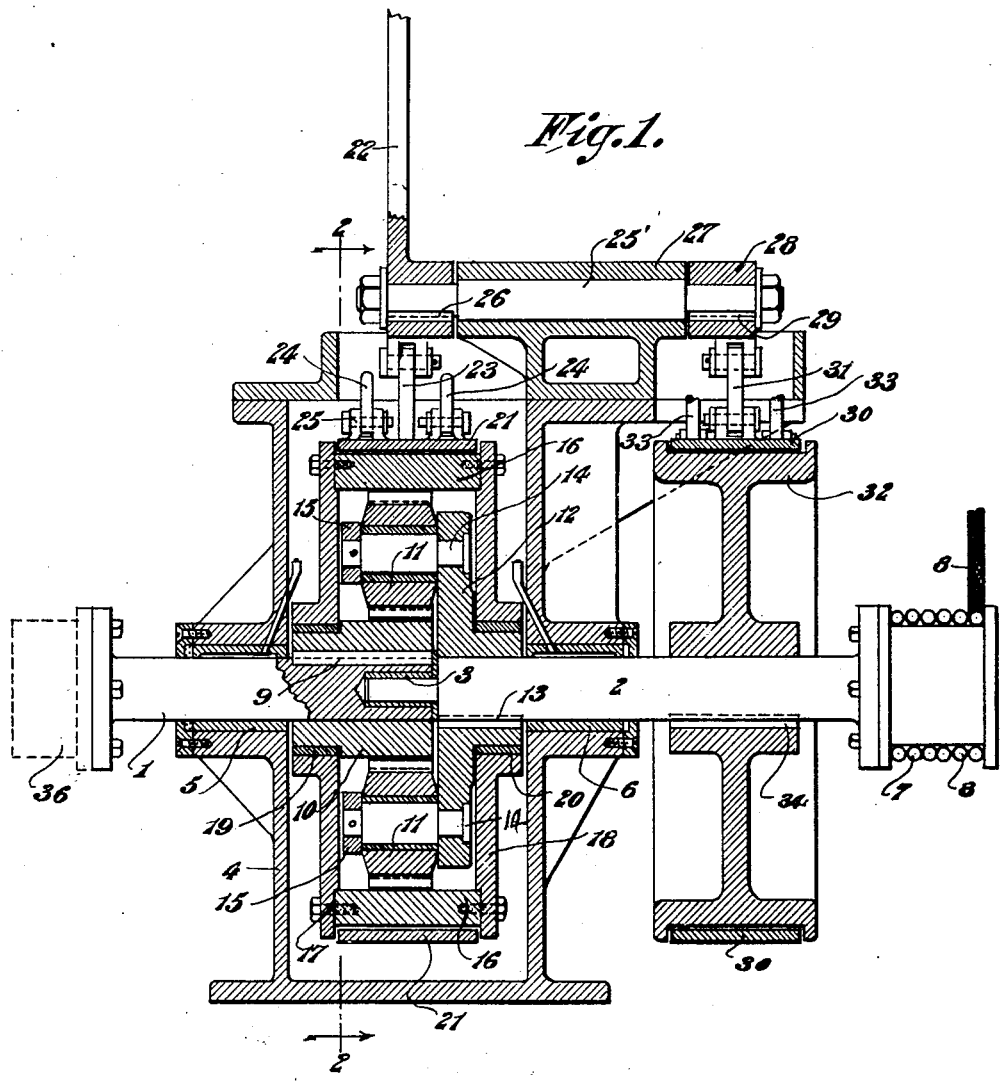

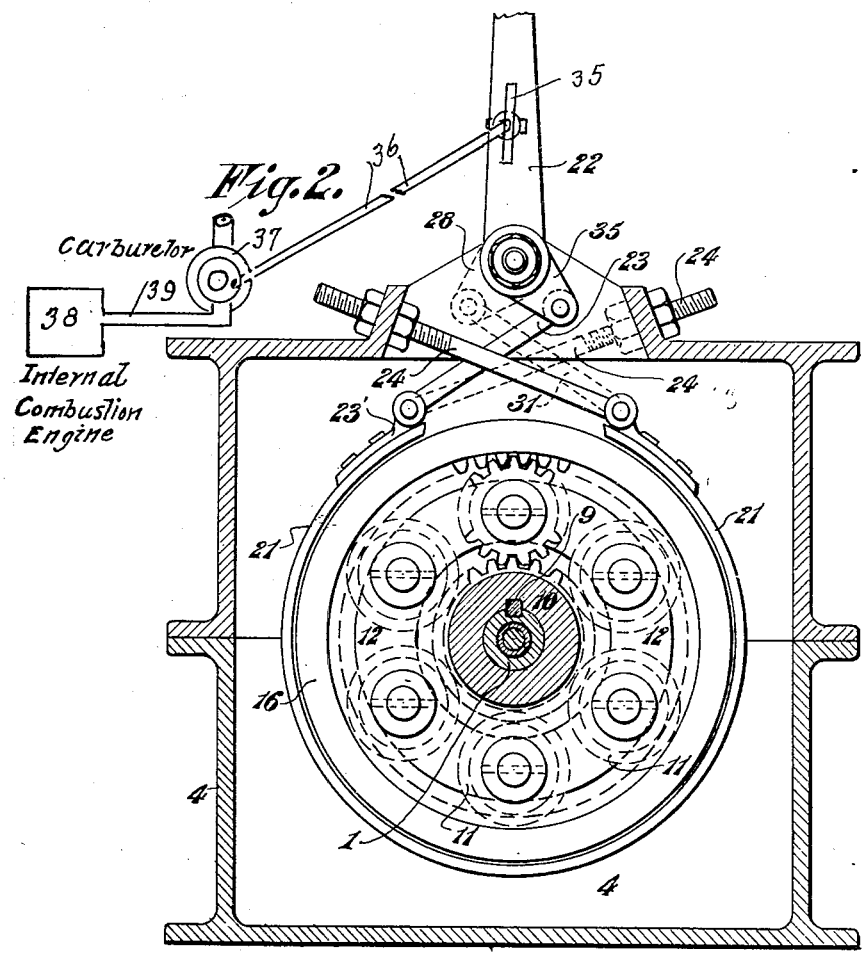

Patented Mar. 19, 1929.

1,706,109

UNITED STATES PATENT OFFICE.

ARTHUR L. DODGE, OF SPRINGFIELD, MASSACHUSETTS.

GEARING FOR HOISTING DRUMS.

Application filed July 21, 1927. Serial No. 207,408.

This invention relates to improvements in gearing for hoisting drums. An object of the invention is to provide a gearing construction which will permit the use of an internal combustion engine, as a motive power. It is a well known fact that the load can not be suddenly thrown on to such an engine without stalling or nearly stalling the same. Engine clutch devices are used to connect the load with the crank shaft of the engine in order to permit the load to be gradually applied. The present invention is therefore designed to apply this principle to a hoisting drum.

Broadly, the present invention employs a system of gearing of the planetary type in which the sun gear is secured to a shaft which is connected to the internal combustion engine. This gear meshes with and turns a series of gears that are mounted on a plate or disk that is keyed to the driven shaft which operates or carries the hoisting drum. These two shafts, that is to say the driving and driven shafts have a common bearing, one within the other, at their meeting ends. An internal gear ring is rotatably mounted on the said plate and with which the planet gears engage. This gear ring is surrounded by a brake band for permitting the gear ring to run freely or to retain it in a fixed position. Secured to the second shaft is a brake drum, and around which is located a brake band. Means are provided for connecting the two brake bands together in order that they may be operated at the same time. The construction and arrangement of the connection between the bands is such that one band may be tightened and the other loosened and vice versa, for gradually applying and removing the load on the internal combustion engine.

Referring to the drawings:

Fig. 1 is a vertical sectional view considered in a vertical plane passing through the axis of the machine, showing the driving and the driven shafts, the two brake drums, the internal ring gear and the sun and planet gears, and Fig. 2 is a transverse sectional view on the line 2—2 of Fig. 1 looking in the direction of the arrows, illustrating the driving shaft, the sun gear thereon, the planet gears, and also the lever means for operating the two brake bands.

Referring to the drawings in detail:

1 designates the driving shaft, which is connected to the internal combustion engine, as indicated at 36, 2 is a driven shaft. These shafts have a common bearing, one within the other as indicated at 3. 4 is a supporting casing for providing bearing boxes 5 and 6 for the shafts 1 and 2; it is understood that the shaft 2 is connected to the hoisting drum indicated at 7, 8 designates the cable thereon. Secured to the shaft 1 by means of the key 9 is a sun gear 10. This gear meshes with the series of planet gears 11, which gears, 11, are rotatably mounted in the plate or disk 12, which is keyed to the driven shaft 2 as shown at 13. The gears 11 are mounted on the bearing pins 14 in the plate 12, at one end, and secured to the other or opposite ends of the pins are bearing rings 15. The gears 11 mesh with the internal teeth of the gear ring 16. This ring is secured to the oppositely located disk plates 17 and 18, which plates have a bearing on the sun gear 10 at 19 and on the plate 12 at 20.

Surrounding the outer surface of the internal gear ring 16 is a brake band 21. 22 is a hand lever that is connected to the brake band 21 by means of the link 23, which is attached to the offset arm 35 at one end and to the bracket 23′ at its other end. 24 are two bolts that are connected to the brake band 21 by means of the flange and bolt connections 25 for supporting the bands around the drum. These connections are clearly indicated in Fig. 2. The manual lever 22 is connected to the shaft 25′ as indicated by the key at 26. This shaft has a bearing in the part 27. The opposite ends of the shaft is keyed to the collar 28, as indicated at 29. This collar is connected to the brake band 30 by means of the link 31, which is connected to the arm 28. The brake band 30 is supported about the brake drum 32 by means of the bolts 33, the brake drum 32 is keyed to the shaft 2 as indicated at 34. The lever 22 is formed at its lower ends with an angular offset arm portion 35, to which the link 23 is connected. The offset part 28 is an arm which is located in an angular relation to the fixed arm 35 which is shown in Fig. 2, in dotted line position.

The purpose of the offset angular relation of the arms 28 and 35 is to cause one of the brake bands as 21 to grip the internal gear ring 16 and to release the brake band 30 on the brake drum 32 as the lever 22 is operated, or in other words one drum is held against movement while the other is rotated freely.

The operation is described as follows: Consider the shaft 1 as being continuously driven by the combustion engine as indicated at 36. Also, consider the brake band 21 as being released. The sun gear 10 will rotate the planet gears 11, these in turn will rotate the plate or disk 16 and the gear ring 16 will in turn rotate the disks 17 and 18 on their bearings 19 and 20. The shaft 2 is now idle. If it is desired to operated the shaft 2 and the hoisting drum 7 the operator will move the lever 22 which will gradually tighten the brake band 21 on the ring 16, causing the ring to be held stationary; at the same time the brake band 30 is released from the drum 32, the sun gear 10 now operates the planet gears 11, which revolve on the internal gear ring 16, which causes the plate 12 to be operated and this in turn will turn the shaft 2 through the key 13 and operate the drum 7. Since the brake band 30 is now released the drum 32 will rotate idly. In the reverse operation for stopping the drum 7, the lever 22 is moved in the opposite direction causing the drum 32 to be held securely, and the internal gear ring 16 to revolve idly and the plates 17 and 18 will turn on the bearings 19 and 20.

It will therefore be seen that I have provided a system of gearing for operating a hoisting drum from an internal combustion engine that will permit the engine to operate continuously without being stalled, when the load is applied.

35 designates a slot in the lever 22 in which is adjustably connected the rod or link 36 at one end and to the carburetor 37 at its other end. 38 is an internal combustion engine which is connected to the carburetor 37 by means of the gas supply pipe 39. The purpose of this connection is to feed a supply of gas to the internal combustion engine when the load is applied, and, to shut it off when the load is withdrawn.

What I claim is:

A hoisting mechanism comprising in combination, a driving and a driven shaft arranged in axial alignment and one turning within the other, a casing, bearings on the casing for supporting the said shafts, a sun gear secured to the driving shaft and having an external bearing surface, a plate member secured to the driven shaft and formed with an external bearing surface, planet gears rotatably mounted on the plate member and meshing with the sun gear, a pair of disc plates rotatably mounted on the external bearing of the sun gear and the external bearing of the said plate member, an internal gear ring secured between and to the pair of disc plates, a brake band located around the outer surface of the internal gear ring, a bolt connected to one end of the brake band and adjustably secured to a fixed part of the casing for supporting the brake band, a shaft, an operating lever secured to the shaft, a link connection between the other end of the brake band and the shaft, a hoisting drum on the driven shaft, a brake drum secured to the driven shaft, a brake band on the outer surface of the brake drum, one end of the second mentioned brake band being connected to the casing and its other end being connected to said lever operated shaft, the construction and arrangement being such that when the lever and shaft is operated one brake band will be tightened and the other gradually loosened on the ring gear and brake drum respectively, and vice versa, whereby the load is gradually applied and removed from the hoisting drum.

ARTHUR L. $\overset{\text{his}}{\times}$ DODGE.
mark